United States Patent [19]

Diels et al.

[11] Patent Number: 5,175,664
[45] Date of Patent: Dec. 29, 1992

[54] DISCHARGE OF LIGHTNING WITH ULTRASHORT LASER PULSES

[76] Inventors: Jean-Claude Diels, 13517 Sunset Canyon N.E., Albuquerque, N. Mex. 87111; Xin M. Zhao, 124 Cardenas Dr. N. E. Apt. 12, Albuquerque, N. Mex. 87108

[21] Appl. No.: 804,268

[22] Filed: Dec. 5, 1991

[51] Int. Cl.⁵ .............................................. H02H 3/22
[52] U.S. Cl. ..................................... 361/213; 361/117
[58] Field of Search .............. 361/217, 218, 213, 117; 307/149

[56] References Cited

U.S. PATENT DOCUMENTS 3,584,260  6/1971  Barbini et al. ......................... 317/61
4,017,767  4/1977  Ball ...................................... 361/117

Primary Examiner—A. D. Pellinen
Assistant Examiner—Aditya Krishnan

[57] ABSTRACT

An arrangement for discharge of electricity or lightning in the atmosphere to prevent formation of space charges that would reduce the strength of electric fields therein by transmitting through a path in the atmosphere one or more first leaser pulses of wavelength essentially within the ultraviolet range and of duration sufficient to create an electrically conductive ionized channel in the atmosphere and simultaneously transmit in said path one or more second laser pulses of longer wavelength than the ultraviolet pulses to maintain the conductivity of the channel for a time long enough for lightning to occur therein.

15 Claims, 4 Drawing Sheets

DISCHARGE OF LIGHTNING WITH ULTRASHORT LASER PULSES

This invention was made under a contract with the Department of the Air Force, and the U.S. Government has certain rights therein.

FIELD OF THE INVENTION

This invention is in the field of triggering lightning through radiation, particularly lasers, to enable protection of airports and rocket launch areas, and to prevent or reduce hail in agricultural areas.

BACKGROUND

There have been attempts in the mid 70's to trigger lightning by sending a powerful infrared laser beam through the atmosphere [Jr. C. W. Schubert. *The Laser Lightning Rod System: a Feasibility Study.* Technical Report AFFDL-TR-78-60, Air Force Flight Dynamics Laboratory, 1977]. Because of the long wavelength of these lasers, it would have taken a 100-photon process to ionize the air. However, the field of the intense laser beam was sufficient to create avalanche ionization of air, leading to a plasma. The method failed, because the dense plasma created is opaque to the beam, and prevented further propagation of the laser radiation.

Lightning between ground and cloud can be triggered by a inserting a conducting path to ground above the naturally-occurring space charge layer at a speed higher than the speed of space-charge ions. When this happens, space charge can no longer reduce the field at the tip of the conductor, so the enhanced fields at the tip can be large enough to initiate breakdown, with a resulting leader propagating from the ground to the cloud. A number of investigators have used this principle to trigger lightning by firing small rockets, pulling up grounded wires [M. M. Newman, J. R. Stahmann, J. D. Robb, E. A. Lewis, S. G. Martin, and S. V Zinn. Triggered lightning at close range. *J. Geophys. Res.*, 72, 1967.

The success rate of this method is only about 50%. The speed of the rocket is not always sufficient to prevent formation of space charges that reduce the field between the cloud and the rocket. Finally, rockets cannot be fired continuously, as a laser can.

SUMMARY OF THE INVENTION

In accordance with the invention lightning is triggered by creating ionized oxygen and nitrogen plus electrons—an ionized channel—by one or more high energy femtosecond UV pulses, and simultaneously sending one or more laser pulses of longer wavelength and duration (e.g. visible) through the same path to maintain the conductivity of the channel for a time long enough for the lightning to occur (the longer wavelength second pulse detaches electrons captured either as $O_2^-$ or $O^-$. This technique is shown in the diagram of FIG. 1 which illustrates ground-to-cloud lightning triggering using a laser beam carrying a femtosecond (fs) UV pulse (solid line) and a longer, visible laser pulse (dashed line). A minimum repetition rate of 10 Hz for both pulses ensures that a preferential path for the electrical discharge (i.e. triggering of lightning) is maintained at all times. The femtosecond UV pulse is prepared with a frequency modulation such that it is compressed as it propagates through the atmosphere. The purpose of the compression is to increase the peak intensity to compensate for losses incurred as the pulse propagates through the atmosphere.

The arrangement of the present invention applies as well to the internal discharge of electricity in a cloud (lightning in clouds). An intracloud discharge can be made if a conductive (ionized) channel is created between the base and top of the cloud with the same sequence of one or more femtosecond UV pulses and one or more long (nanosecond to microsecond) visible pulses. In order to make a clear (transparent) optical path through the cloud, the above-mentioned pulses are to be preceded by a strong infra red, long laser pulse (such as is produced by a $CO_2$ laser) which evaporates the water droplets in the cloud. This is shown in FIG. 2 where a beam carrying a fs UV laser pulse (solid line) is accompanied by two other beams: a longer, visible laser pulse (dashed line) and a large $CO_2$ laser beam (dotted line).

BRIEF DESCRIPTION OF THE DRAWINGS

Reference is now made to the drawings in which.

DETAILED DESCRIPTION OF THE INVENTION

Figure 1:
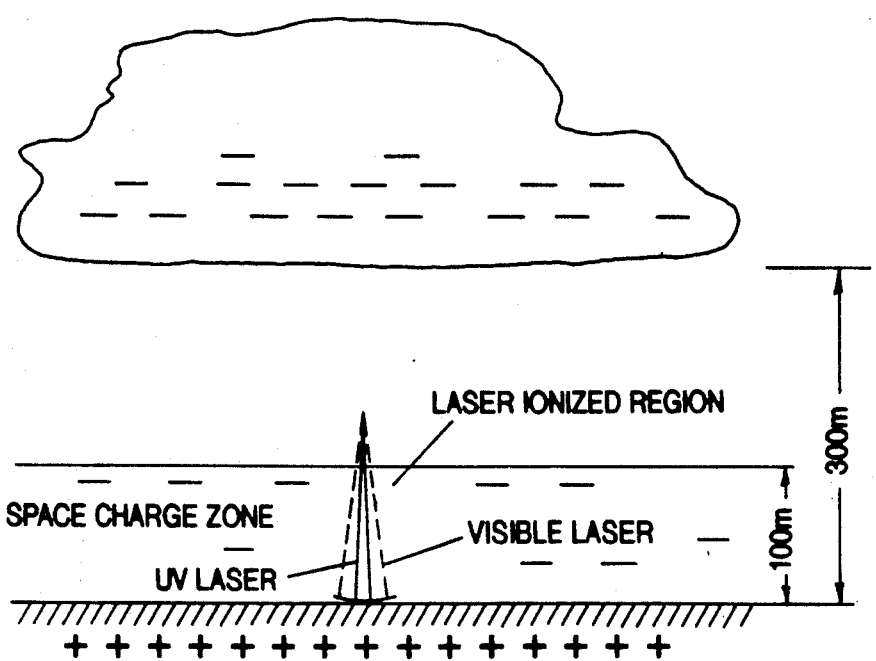
FIG. 1 is a diagrammatic view of ground-to-cloud lightning triggering in accordance with an embodiment of the invention.
Figure 2:
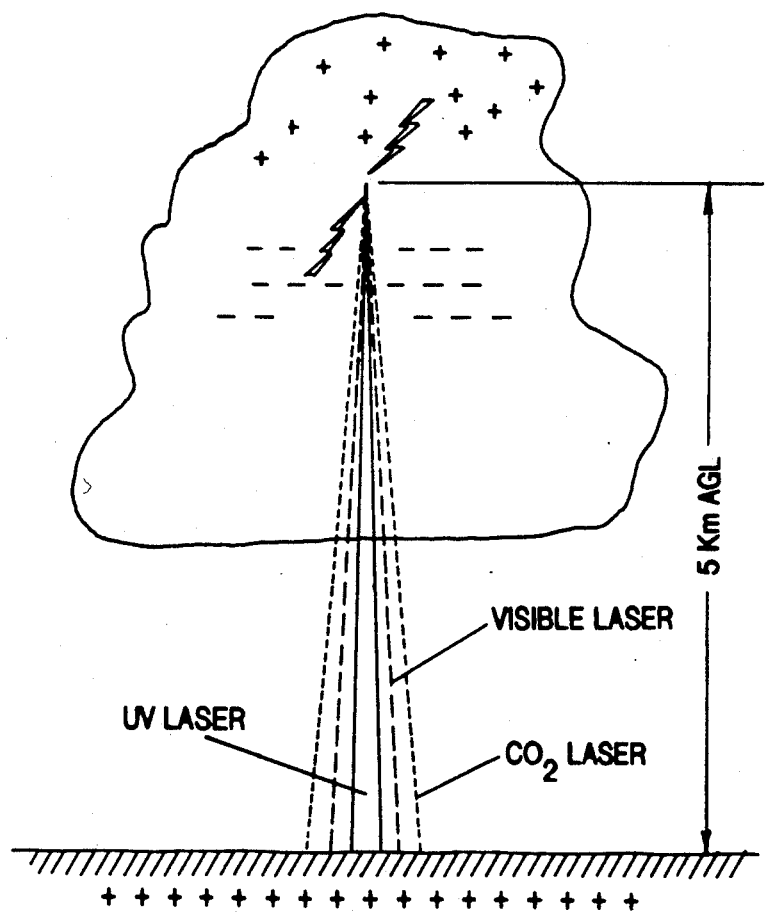
FIG. 2 is a diagrammatic view of within-cloud triggering of lightning in accordance with the embodiment of the invention.

There are several key considerations involved in the carrying out of the present invention in order to provide the appropriate excitation to enable the triggering of lightning. One is the choice of optimum ultraviolet wavelength for the short duration laser pulses referred to earlier in connection with FIGS. 1 and 2.

The optimum ultraviolet wavelength of the short duration laser pulse should be such that it takes no more than three or four photons to ionize the nitrogen and the oxygen in air. A wavelength of 248 nm is the preferred choice, because three photons for oxygen and four photons for nitrogen at that wavelength will ionize the nitrogen and oxygen, and because powerful and efficient lasers and laser amplifiers (KrF lasers) are commercially available at that wavelength.

As an alternative, excimer lasers at 308 nm (XeCl) or 350 nm (XeF) may be used for four photon ionization of nitrogen and oxygen. The latter lasers require higher peak powers to reach the same level of ionization, but have the advantage of better atmospheric transmission characteristics.

Another consideration is the choice of pulse duration. For the same energy, a short pulse has a higher peak intensity I, hence will ionize air more efficiently (the three-photon ionization rate is proportional to $I^3$, the four photon rate is proportional to $I^4$).

If the pulse duration is short enough (of the order of 100 femtoseconds), it is possible to "pre-shape" (phase or frequency modulate) the ionizing pulses, so that the dispersive properties of air will produce pulse compression (hence peak power amplification). Such a pulse phase or frequency modulation can be made for instance by propagating the pulse through diamond (in the case of radiation at 248 nm). This peak power amplification is needed to compensate the depletion of the beam by the ionization it creates.

Figure 3:
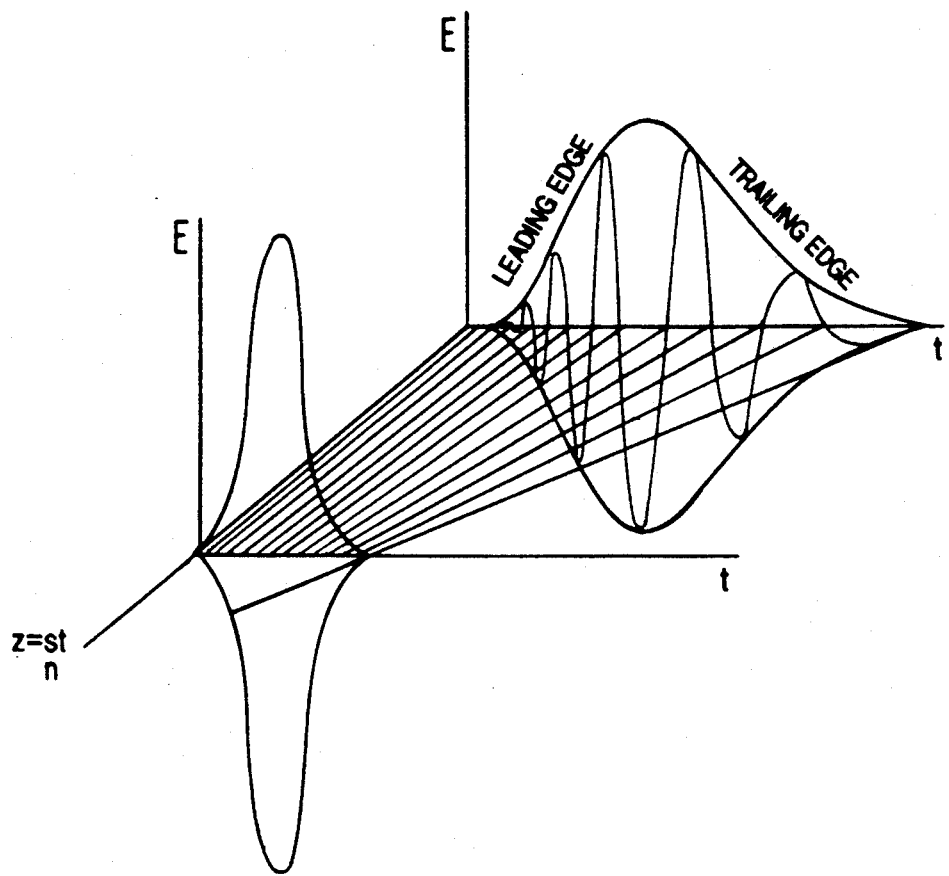
FIG. 3 is a view of the pulse compression mechanism associated with the wave propagation in accordance with the invention.

After passing through a phase modulator (which may, for example, be a thin diamond crystal), the pulse is frequency modulated so as to have a shorter wavelength at the beginning of the pulse than at the pulse tail. This is illustrated in FIG. 3 which, in accordance with the invention, shows a pulse being frequency modulated after passing through a nonlinear crystal (diamond for instance). With a decreasing frequency sweep with time, propagation through air results in pulse compression, because the higher optical frequencies (shorter wavelengths) in the front of the pulse propagate more slowly than the frequency components constituting the pulse tail.

Because of the larger refraction of air at shorter wavelengths, the pulse front propagates slower than the pulse tail. If the pulse duration and modulation are chosen properly, a minimum pulse duration (hence largest peak intensity) is reached at the desired altitude (circa 100 m for triggering ground to cloud lightning).

As and after the ionizing pulse is transmitted, the electrons attach to the oxygen to create the negative ions $O_2^-$ and $O^-$, which, as ions, have too small a mobility to contribute effectively to the conductivity of the channel. The solution to that in accordance with the invention is to irradiate the ionized channel with a laser pulse that will detach the charge (i.e. the electrons) from these negative ions. A preferred wavelength for this process is 530 nm, which is that of a frequency doubled Nd laser generally used to pump either a primary laser oscillator or amplifier. The problems caused by ionization in connection with triggering lightning, addressed by the present invention, and the solutions provided in accordance with the present invention are summarized as follows:

| Problem | Solution |
| --- | --- |
| Uniform ionization along the beam | Multiphoton ionization |
| High intensity for ionization | Femtosecond pulse |
| Pump depletion due to losses | Pulse compression in air using frequency modulated pulses |
| e⁻ attachment to oxygen | simultaneous long laser pulse |

Figure 4:
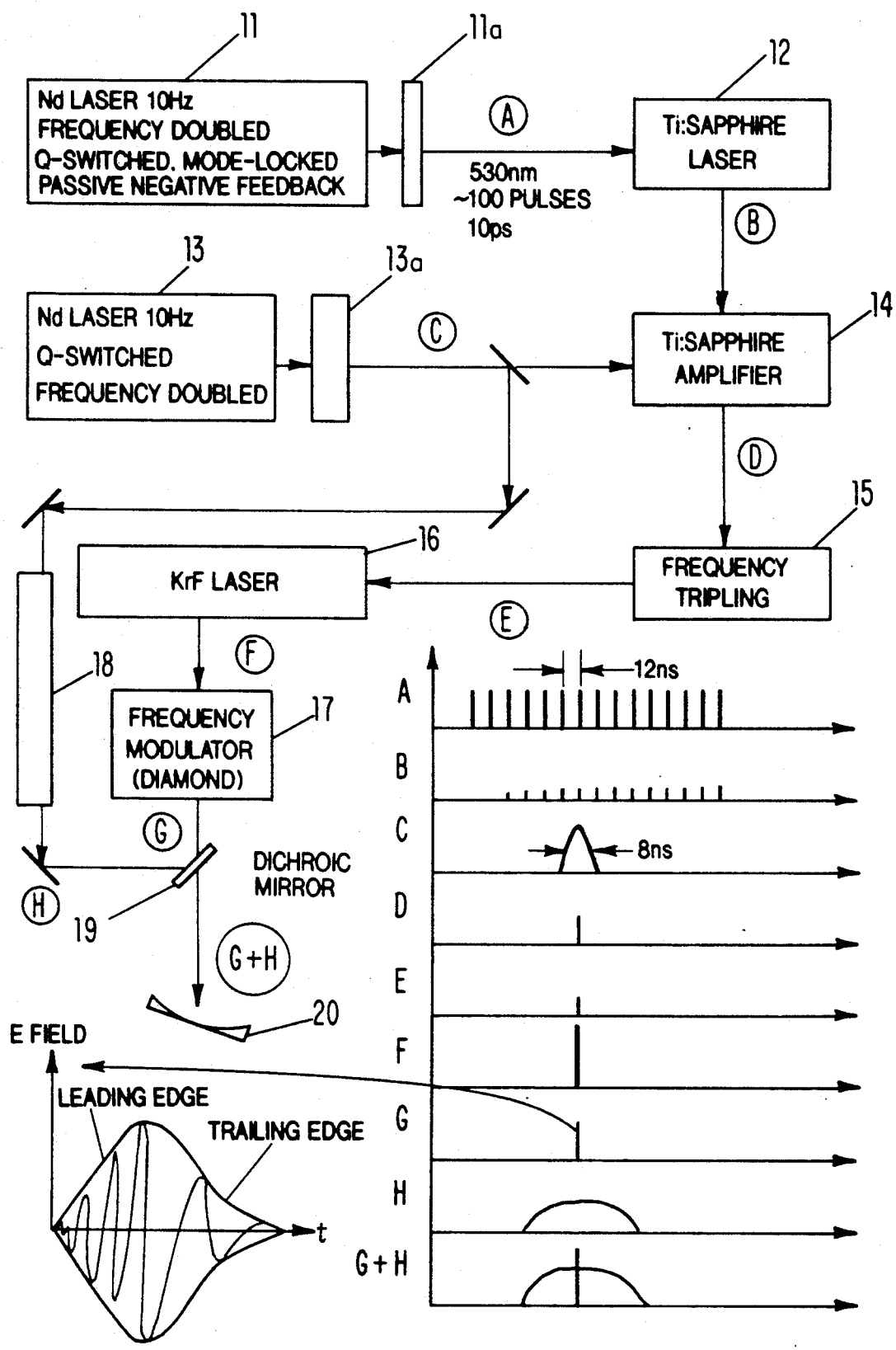
FIG. 4 is a schematic block diagram of a laser source configuration (with waveform diagram) in accordance with an embodiment of the invention.

The preferred configuration for implementing the present invention is shown in FIG. 4. A flashlamp pumped Nd laser source 11, Q-switched, mode-locked, and stabilized by passive negative feedback, generates a train of 100 to 200 pulses of 10 ps duration each at an infrared wavelength of 1060 nm. Such a flashlamp-pumped infrared laser source operates at a repetition rate typically between 1 and 50 Hz. The operation of such a laser is state of the art, and explained and described in the following article: A. Agnesi, J.-C. Diels, P. Di Trapani, V. Kubecek, J. Marek, G. Reali, and C. Y. Yeh. "Passive feedback for stable short pulse generation", in Mourou Harris, Ippen and Zewail, editors, *Picosecond Phenomena VII*, pages 38–40, Springer-Verlag, Berlin, 1990.

The infrared pulses produced by the above-described laser source are frequency doubled in a crystal 11a of potassium di-deuterium phosphate ("KDP") or potassium trihydrogen phosphate ("KTP"), in accordance with well known techniques used by several manufacturers of Nd lasers, to convert the wavelength of 1.06 μm produced by the laser 11 to 530 nm, indicates as pulses "A", which pump synchronously a Ti:sapphire laser 12 producing a train of pulses B of 100 fs duration at the wavelength 744 nm, in any well known manner such as is described and explained in the article by A. Schmidt in Optics Comm, August 1991.

A second flashlamp-pumped, Q-switched (but not mode-locked) Nd laser 13 produces pulses which are frequency doubled via doubler 13a similar to 11a to the wavelength of 530 nm, to produce pulses C with a repetition rate typically between 1 and 100 Hz. Elements 13 and 13a may be provided through use of a "DCR-3" laser instrument that can be purchased from Quantaray-Spectra Physics). Pulses C pump a Ti:sapphire amplifier chain 14 to provide pulses D of energy greater than the energy in the pulses B produced by the fs Ti:sapphire laser 12. The amplified pulses D are each of 100 fs duration and these pulses have the same repetition rate as the pulses C produced by the second Q-switched laser 13 with an energy of at least 1 mJ. They are thereafter converted to a wavelength of 248 nm by frequency tripling the pulses in a tripler 15 to produce pulses E each of 100 fs duration and 10 μJ energy at 248 nm, in any suitable well known manner, such as, for example, by using a combination of two crystals of KDP or one crystal of KDP and one crystal of barium-beta-borate ("BBO"). These crystals can be purchased for this purpose from several manufacturers, for instance Quantum Technology in Lake Mary, Fla.).

The pulses E of each 100 fs duration and 10 μJ energy at 248 nm are sent through a KrF excimer laser 16 for amplification (two passages or more), following a well known technique involving multiple passages, found in the brochure of the excimer laser manufacturer "Lambda Physik", provide pulses F having energy of approximately 30-30 mJ. Between passages, the pulses E are also sent through a frequency modulator 17 that will give the pulse the desired modulation of frequency (frequency decreasing monotonically with time during the pulse). Modulator 17 can be a suitable well known device such as a saturable absorber, as described in the publications: W. Dietel, J. J. Fontaine, and J.-C. Diels. "Intracavity pulse compression with glass: a new method of generating pulses shorter than 60 femtoseconds". *Optics Letters*, 8:4–6, 1983; and J.-C. Diels. *Dye laser principles: with applications*, chapter Femtosecond dye lasers, pages 41–131. Academic Press, Boston, 1990.

A pulse with a negative frequency sweep (higher frequency or shorter wavelength at the leading edge than at the trailing edge) is compressed as it propagates through most transparent materials such as glass or air. This has been demonstrated previously by compressing 5x pulses of 500 fs duration, at a wavelength of 620 nm, in 10 cm of glass. These results have been been discussed in: J.-C. Diels. *Dye laser principles: with applications*, chapter Femtosecond dye lasers, pages 41–131. Academic Press, Boston, 1990; J.-C. Diels, J. J. Fontaine, I. C. McMichael, and F. Simoni. "Control and measurement of ultrashort pulse shapes (in amplitude and phase) with femtosecond accuracy." *Applied Optics*, 24:1270–1282, 1985.

The compression is due to the fact that, as shown in FIG. 3, for the leading edge of the pulse (at a shorter wavelength), the index of refraction of the medium traversed is larger, hence the velocity shower than for the trailing edge. Standard tables of index of refraction versus frequency or wavelength show that 100 m of air at 248 nm will produced approximately the same slowing down of the leading edge—as compared to the trailing edge of the pulse—as 10 cm of glass at 620 nm.

In accordance with the invention, the preferred medium to produce the desired sweep of frequency at the wavelength of 248 nm is a crystal of diamond. This is based on measurements of modulation at different wavelengths extrapolated to be wavelength of interest (248 nm). These measurements are published in: M. Sheik-Bahae, A. A. Said, and E. W. Van Stryland. "High sensitivity, single beam $n_2$ measurements." *Opt. Lett.*, 14, 1989. Other factors leading to the choice of diamond are based on measurements of nonlinear absorption, from which one can calculate the frequency modulation resulting from transmission through the diamond. The crystal of diamond 17 used for frequency modulation is preferably positioned to receive the output from the excimer amplifier (KrF) 16. Alternatively, it may be positioned between the first and second passage of the pulse to be amplified through this amplifier chain 14.

Before being sent through the atmosphere, the amplified, frequency-modulated femtosecond pulse G of about 200 fs duration produced by modulator 17 is combined with green pulses H from a pulse stretcher 18 via a dichroic beam splitter 19, that is transparent to 248 nm, and reflecting the green (530 nm) pulse produced by source 13 and doubler 13a. Pulse stretcher 18 extends the pulse C produced by 13a to form the stretched pulse H by splitting the 8 ns pulsew C into a sequence of 4 successive pulses. The green pulses H can be derived from the Nd laser 13 used to pump the amplifier 14 as shown in FIG. 4.

Figure 5:
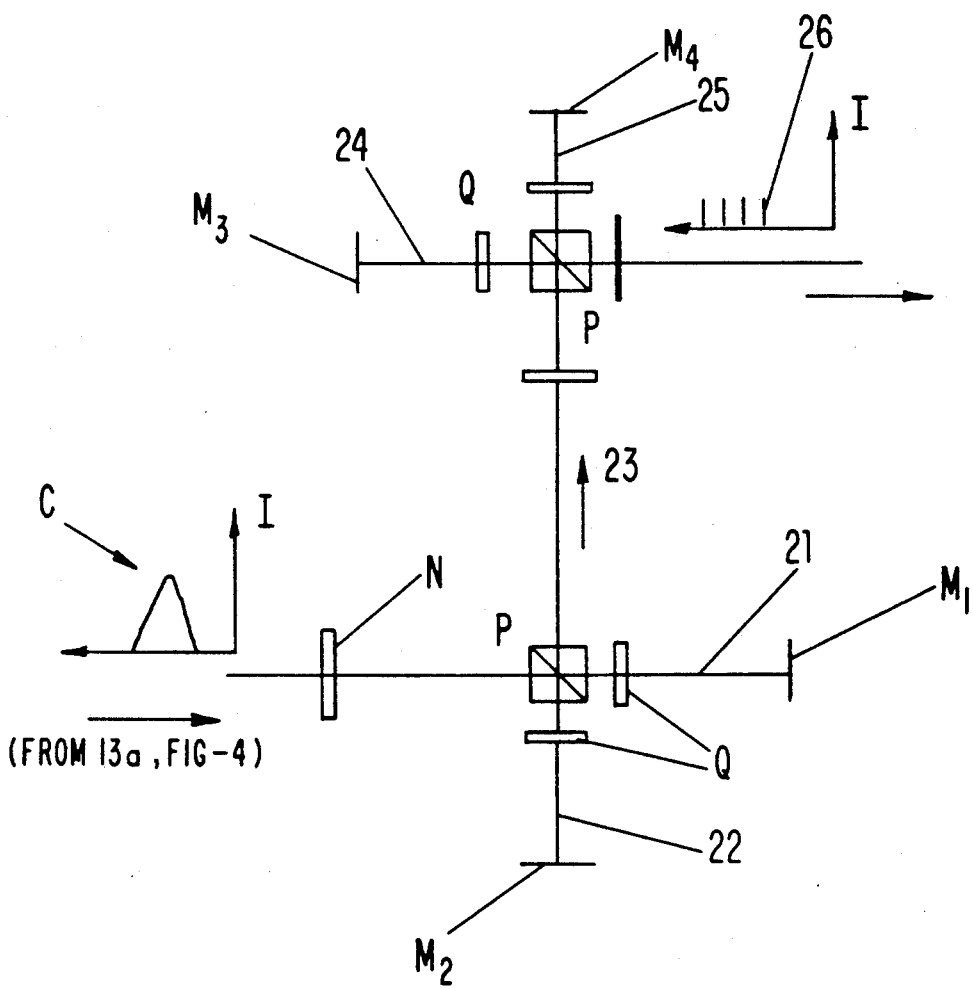
FIG. 5 is a schematic diagram of optical pulse stretching in accordance with the invention.

The pulse stretcher 18 is essentially a combination of mirrors shown in FIG. 5. The pulse C is stretched into a sequence of pulses as shown in the left side of FIG. 5. As shown in FIG. 5, a half wave plate N is used to turn the polarisation of that beam at 45° with respect to the plane of the figure. As a result, the polarizer P splits the beam in two equal components 21, 22. The two components are retroreflected by mirrors $M_1$ and $M_2$. Their polarization is rotated 90° after double passage through a quarter wave plate Q. As a result, they are redirected by the polarizing beam splitter P in another direction 23, through another half wave plate H, rather than along the initial beam path. Instead of one pulse, there are now two successive pulses in the arm 23, separated by a distance equal to twice the difference between arms 21 and 22. The same process is repeated in the second assembly of polarizer, half and quarter wave plates, and mirrors $M_3$ and $M_4$. The pair of pulses in split into two successive pairs in the output 26, separated by a distance equal to twice the difference between arms 24 and 25. The desired number of division of the original pulse can be obtained by a cascade of elements as the one represented in FIG. 5.

An alternative to the use of the laser 13 and pulse stretching, is to use an additional laser, preferably a Q-switched Nd laser with intracavity semiconductor to produce the long pulse, as discussed by: J. Schwartz, W. Weiler, and R. K. Chang. "Laser-pulse shaping using inducible absorption with controlled Q-switch time behavior." *IEEE J. of Quantum Electronics*, QE-6:442–450, 1970.

The two laser beams G and H are sent into the atmosphere via parabolic or spherical mirrors, generally indicated by the numeral 20, in any suitable well known manner.

I claim:

1. The method of enabling discharge of electricity or lightning in the atmosphere in a manner essentially preventing the formation of space charges that would reduce the strength of electric fields therein comprising the steps of:
   a) transmitting through a path in the atmosphere one or more first laser pulses of wavelength essentially within the ultraviolet range and of duration sufficient to create an electrically conductive ionized channel in the atmosphere, and
   b) transmitting in said path essentially simultaneously with said one or more ultraviolet pulses one or more second laser pulses of longer wavelength than said ultraviolet pulses to maintain the conductivity of the channel for a time long enough for lightning to occur therein.

2. The method of claim 1 wherein the repetition rate for both said pulses is at least approximately 10 Hz.

3. The method of claim 1 wherein each ultraviolet pulse is frequency modulated so as to be compressed as it passes through the atmosphere.

4. The method of claim 1 wherein the wavelength of each of said second laser pulses is essentially in the visible range.

5. The method of claim 1 wherein the wavelength of each of the ultraviolet laser pulses is approximately 248 nm and the duration is no greater than approximately 500 femtoseconds.

6. The method of enabling discharge of electricity or lightning in the atmosphere in a manner essentially preventing the formation of space charges that reduce the strength of an electric field, said atmosphere containing water droplets, comprising the steps of:
   a) transmitting in a path in the atmosphere one or more laser pulses of wavelength essentially greater than the visible range and of sufficient strength and duration to evaporate a substantial proportion of the water droplets in said path;
   b) transmitting in said path at a time overlapping or immediately following the transmission of the pulses in step a) one or more laser pulses essentially within the ultraviolet range and of duration sufficient to create an electrically conductive ionized channel in the atmosphere, and
   c) transmitting in said path essentially simultaneously with said of said ultraviolet laser pulses one or more laser pulses each of wavelength longer than each ultraviolet laser pulse to thereby maintain said electrically conductive channel.

7. The method of claim 5 wherein the frequency of each of the pulses transmitted in step c) is in the visible range.

8. The method of claim 5 wherein the frequency of each of the pulses transmitted in step a) is essentially in the infrared range.

9. Apparatus for enabling the discharge of electrically or lightning in the atmosphere comprising:
   a) first means for transmitting in a path through the atmosphere one or more first laser pulses each of wavelength essentially within the ultraviolet range and of duration sufficient to thereby create an electrically conductive ionized channel therein, and b) second means for transmitting in said path essentially simultaneously with said first means one or more second laser pulses each of wavelength longer than the wavelength of said first laser pulses to thereby maintain the electrical conductivity of said channel for a period sufficient to enable electrical discharge or lightning therein.

10. Apparatus as in claim 9 further comprising:

c) third means for transmitting in said path just prior to or overlappingly with said first means one or more additional laser pulses each of wavelength longer than that of second laser pulses to thereby cause the substantial evaporation of water droplets in said path.

11. Apparatus as in claim 9 wherein the wavelength of each of said first laser pulses is approximately 248 nm.

12. Apparatus as in claim 9 wherein the wavelength of each of said second laser pulses is essentially in the visible range.

13. Apparatus as in claim 10 wherein the wavelength of each of said additional laser pulses is essentially in the infrared range.

14. Apparatus as in claim 9 wherein the duration of each of said first laser pulses is approximately 500 femtoseconds or less.

15. Apparatus as in claim 10 wherein the repetition rate for said first, second, and additional laser pulses is approximately 10 Hz.

* * * * *

UNITED STATES PATENT AND TRADEMARK OFFICE
Certificate

Patent No. 5,175,664

Patented: December 29, 1992

On petition requesting issuance of a certificate for correction of inventorship pursuant to 35 U. S. C. 256, it has been found that the above-identified patent, through error and without deceptive intent, improperly sets forth the inventorship.

Accordingly, it is hereby certified that the correct inventorship of this patent is: Jean Claude Diels, Xin Miao Zhao and Chao Yung Yeh.

Signed and Sealed this Twenty-Third Day of December, 1997.

BRIAN W. BROWN
*Special Programs Examiner*
Examining Group 2100